(12) United States Patent
Tarr

(10) Patent No.: US 6,586,849 B2
(45) Date of Patent: Jul. 1, 2003

(54) ELECTRICAL POWER STRIP FOR USE WITH A COMPUTER AND ASSOCIATED PERIPHERAL DEVICES

(76) Inventor: Morton Tarr, 36 Manor Rd., Bolton, MA (US) 01740

( * ) Notice: Subject to any disclaimer, the term of this patent is extended or adjusted under 35 U.S.C. 154(b) by 0 days.

(21) Appl. No.: 10/004,974

(22) Filed: Dec. 4, 2001

(65) Prior Publication Data

US 2003/0102717 A1 Jun. 5, 2003

(51) Int. Cl.[7] .................................................. H02J 1/00
(52) U.S. Cl. ........................ 307/38; 307/139; 713/320
(58) Field of Search ............................ 307/11, 31, 38, 307/125, 139; 713/300, 320

(56) References Cited

U.S. PATENT DOCUMENTS

| | | | | |
|---|---|---|---|---|
| 4,675,537 A | 6/1987 | Mione | ............................ | 307/38 |
| 4,747,041 A | 5/1988 | Engel | ............................ | 364/200 |
| 4,970,623 A | 11/1990 | Pinter | ............................ | 361/187 |
| 5,164,609 A * | 11/1992 | Poppe et al. | ............................ | 307/147 |
| 5,347,167 A | 9/1994 | Singh | ............................ | 307/125 |
| 5,359,540 A | 10/1994 | Ortiz | ............................ | 364/492 |
| 5,408,669 A | 4/1995 | Stewart et al. | ............................ | 395/750 |
| 5,424,903 A * | 6/1995 | Schreiber | ............................ | 361/166 |
| 5,477,476 A | 12/1995 | Schanin | ............................ | 364/707 |
| 5,486,726 A | 1/1996 | Kim | ............................ | 307/120 |
| 5,506,790 A | 4/1996 | Nguyen | ............................ | 700/286 |
| 5,579,201 A | 11/1996 | Karageozian | ............................ | 361/119 |
| 5,675,813 A | 10/1997 | Holmdahl | ............................ | 395/750 |
| 5,721,934 A | 2/1998 | Scheurich | ............................ | 395/750 |
| 5,731,947 A | 3/1998 | Hirose | ............................ | 361/160 |
| 5,767,844 A | 6/1998 | Stoye | ............................ | 345/212 |
| 5,904,591 A | 5/1999 | Shiau | ............................ | 439/502 |
| 6,105,143 A * | 8/2000 | Kim | ............................ | 713/324 |
| 6,128,743 A * | 10/2000 | Rothenbaum | ............................ | 713/300 |
| 6,211,581 B1 | 4/2001 | Farrant | ............................ | 307/117 |
| 6,363,491 B1 * | 3/2002 | Endo | ............................ | 713/310 |
| 6,365,989 B1 * | 4/2002 | O'Donnell | ............................ | 307/42 |
| 6,501,195 B1 * | 12/2002 | Barton | ............................ | 307/125 |

\* cited by examiner

*Primary Examiner*—Brian Sircus
*Assistant Examiner*—Sharon A. Polk
(74) *Attorney, Agent, or Firm*—McLane, Graf, Raulerson & Middleton, P.A.

(57) ABSTRACT

An electrical power strip that can be used in conjunction with a computer so as to allow peripheral devices associated with the computer to be automatically turned on or off simultaneously with the computer being turned on or off. The power strip preferably includes a USB connector that allows the power strip to be connected to the power source provided by the USB port of a computer. The power strip further includes a relay element that effectively energizes the power strip when the connected computer is turned on and de-energizes the power strip when the computer is turned off. Thus, the user can utilize the power strip to ensure that any peripheral devices plugged into the power strip are automatically turned off when the connected computer is turned off and turned on when the computer is turned on.

19 Claims, 3 Drawing Sheets

ELECTRICAL POWER STRIP FOR USE WITH A COMPUTER AND ASSOCIATED PERIPHERAL DEVICES

FIELD OF THE INVENTION

The present invention relates to an electrical power strip, and more particularly, to an electrical power strip that can be used in conjunction with a computer so as to allow peripheral devices associated with the computer to be automatically turned on or off simultaneous with the computer being turned on or off.

BACKGROUND OF THE INVENTION

The term personal computer is used to describe a desktop computer, a mobile computer, a desk side computer, or a small rack mount computer. Typical personal computer systems today have at a minimum a central processing unit ("CPU") and a display monitor. In addition to having a CPU and monitor, many computer users, including users of IBM compatible personal computers ("PC") and Apple Macintosh personal computers, connect their CPUs to one or more peripheral devices. For instance, many people connect a printer, powered speakers, external hard disk drives, CD ROM devices, CD RW devices, and other AC powered peripherals.

The use of multiple peripheral devices creates a need for multiple electrical outlets for plugging in the power cords of the various peripheral devices. Electrical power strips, which typically contain four or more individual outlets, are commonly used to supply the AC power to the peripheral devices connected to a computer, and often the computer itself. The electrical power strip provides a convenient and central mechanism for plugging in the peripheral devices.

Most peripheral devices typically are not used independent of the computer, and in fact, most are not usable when the associated computer is not turned on. Accordingly, when a user is finished using his computer, he must then proceed to turn off the individual peripheral devices. The user can manually toggle the switch on each peripheral device, or if all the devices are plugged into one central power strip, the user can manually turn off all the peripheral devices by toggling the master power switch on the power strip itself In either case, the procedure is not automatic, and it requires a computer user to take an extra manual step to turn off the individual peripheral devices after the user has finished using his/her computer. In many cases, the user leaves the peripheral devices turned on, wasting energy and potentially shortening the life of the devices. Some devices, such as an EnergyStar monitor, will automatically enter a "low power" mode after an extended period of non-use, thereby conserving energy. However, it is important to note that a no power mode is preferable to a low power mode in that a no power mode further reduces energy usage and further extends the life of a peripheral device.

There exist prior art devices that facilitate a computer user's ability to turn off the peripheral devices associated with a computer. For example, U.S. Pat. No. 4,675,537 issued to Mione, discloses a device to detect when a computer is on or off based on sensing the current drawn by the computer. When current is detected above a set point, the computer is deemed to be on, and outlets in a power strip are energized to turn on the peripheral devices plugged into the power strip. Similarly, the outlets are de-energized when the computer is turned off. The Mione patent allows for the inclusion of time delays between the computer turn on and the peripheral turn on. A separate time delay can be provided at turn off as well.

U.S. Pat. No. 4,970,623 issued to Pintar, expands upon Mione's current sensing concept to include detection of current surges indicating specific activity of the computer or a peripheral to automatically turn on the appropriate device by energizing the outlet to which the device is connected. For example, a paper sorter can be turned on by sensed activity of the associated printer, which is turned on by the computer being on. Similar inventions are described for non-computer applications, such as U.S. Pat. No. 4,825,140 issued to St. Louis for sensing line current to turn on and off a vacuum device when a power tool is turned on and off.

One inventor has disclosed an electrical power strip modified such that the devices plugged into the power strip can be energized or de-energized when another main device is likewise energized or de-energized. U.S. Pat. No. 5,579,201, issued to Karageozian in 1996, discloses a power strip that is modified to include a wire or power cord connectable to a main device such that a signal or indication of the state of energization/de-energization of the main device can be delivered to the power strip. The power strip of the Karageozian patent includes an additional power cord. In order for the power strip of the Karageozian patent to be utilized to automatically turn on or off computer peripheral devices, the wire or power cord of the modified power strip would have to be connected to a power output jack on the computer's CPU. Although the Karageozian patent allows for an automated process for shutting down or turning on devices plugged into an electrical strip, the modified power strip requires an additional electrical cord that must be plugged into a power output jack of the main device. The PC marketplace is very competitive, resulting in low profit margins. The cost of the required power jack on the unit is a burden that PC manufacturers have not accepted.

U.S. Pat. No. 6,211,581, issued to Farrant, discloses a power strip that can be connected to a remote control that can be utilized to turn on or off any devices plugged into the power strip. This device is designed to overcome the problem that arises when a power strip is located on the floor, under a desk, or in another area that is difficult to access. Although the remote control makes it easier for a computer user to turn on or off the peripheral devices, it still requires a manual step to turn off the peripheral devices, and it will not prevent peripheral devices from remaining on when the user simply forgets to switch them off.

Accordingly, there exists a need for an economical device that will allow personal computer users to automatically turn their peripheral devices on or off when they likewise turn on or off their computers.

SUMMARY OF THE INVENTION

The present invention is a conventional AC electrical power strip modified to be used in conjunction with a personal computer system, such that the user can have all the peripheral devices automatically turn on or off when the computer is likewise turned on or off. In its elemental form, the power strip device of this invention includes at least one power outlet into which a peripheral device can be plugged. The device also contains a connector port that can receive a Universal Serial Bus ("USB") cable that is connected to the USB port on the computer.

Personal computers manufactured to the industry standard PC97 or PC98 requirements have one or more USB ports. Apple Macintosh computers starting with the Power Macintosh G3 are also equipped with USB ports. As a result, many peripheral devices are now designed such that they can be connected to a personal computer through the USB port. The USB port provides for a simplified and uniform method of connecting various devices to a computer. Important to the device of this invention is that the USB port not only can be used for the transmission of data, but it also provides a switched 5 volt power source.

Accordingly, a USB cable can be used to connect the USB port on a computer to the USB connector of the power strip device of this invention. The power strip device utilizes a relay so that when the computer is turned on and power is supplied via the USB port, the relay is energized, thereby allowing a current to be supplied to the outlets in the power strip. On the other hand, when the computer is turned off, no power is supplied via the USB port, the relay of the power strip is not energized, and any devices plugged into the power outlets in the power strip are not provided power. This presents a practical and failsafe system to ensure that peripheral devices are turned on or off when the associated computer is likewise turned on or off.

Historically, this function could not be accomplished inexpensively. PCs have traditionally had two easily accessible built-in connections, a serial port and a parallel port. These connections provide access to signals and ground but not to power. The mouse and keyboard ports contain power and ground connections, but these connections are live even when the PC is switched off. A device performing the automatic power strip switch function attached to a serial or parallel port would require its own (external) power supply, circuitry to detect activity on the port, and possibly software to create the activity to detect, adding significant complexity and expense. This invention does not require the complexity or expense, by using the USB power supply available in modem (post mid-1998) computers. The USB ports and IEEE-1394 ports that have become nearly universal on Macintosh and PC computers have power connections that switch on when the computer is on, and switch off when the computer is off. All Macintosh computers starting with the G3, and all PC computers starting with the Pentium-II have USB ports. Many current Unix workstations from Sun, HP and SGI have USB ports as well.

The power strip device of this invention can be produced at low cost, and requires little or no software to function. The basic function described above requires absolutely no software, and no effort on the part of the user after initial configuration. It is a completely automated process.

It is an important aspect of this invention to allow personal computer users to conveniently and automatically turn on or off peripheral devices associated with a computer when the computer is likewise turned on or off.

It is another important aspect of this invention to provide a device that will conserve energy by ensuring that powered peripheral devices connected to a computer are turned off when the computer is turned off.

It is a further aspect of this invention to provide a device that will help extend the life of peripheral devices by ensuring that powered peripheral devices connected to a computer are turned off when the computer is turned off.

It is another important aspect of this invention to provide a modified power strip device that can be produced inexpensively.

It is a further aspect of this invention to provide a device that can be used to automatically turn on or off peripheral devices without any software requirements.

It is an important aspect of this invention to provide a device that can be used by way of a simple connection to a personal computer's USB port, with which modern computers are universally equipped.

DETAILED DESCRIPTION OF THE INVENTION

Figure 1:
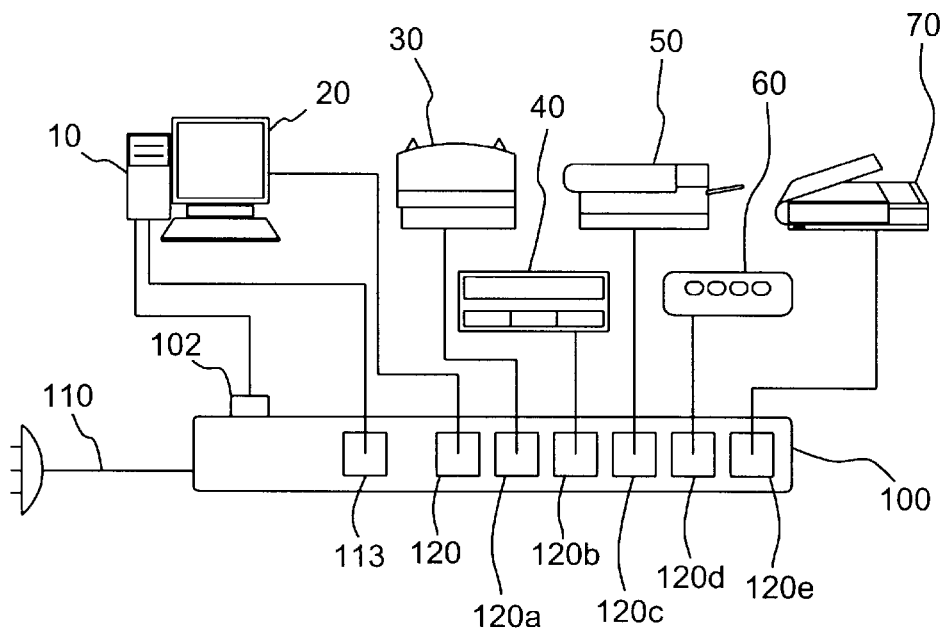
FIG. 1 illustrates a layout of the electrical power strip device and its connection to a personal computer system and associated peripheral devices.

FIG. 1 illustrates a layout of the electrical power strip device of this invention and its connection to a personal computer system and associated peripheral devices. The power strip comprises a conventional housing 100 having at least one power outlet 120 for receiving a plug for an AC powered component. The preferred embodiment of this invention, contains multiple power outlets 120, 120a, 120b, 120c, 120d, and 120e, thereby allowing the user to plug in multiple peripheral devices. The power strip also contains an isolated power outlet 113, which, as described further below, is not controlled by the relay element of the power strip. Thus, the isolated power outlet 113 provides a convenient power outlet for plugging in the computer CPU 10. The housing 100 of the power strip may also contain a USB connector 102 for receiving a USB plug and connecting the power strip to the computer CPU 10. Extending from the power strip is a cord and plug 110 for delivering AC power to the power strip.

FIG. 1 further illustrates an arrangement of peripheral devices commonly connected to a personal computer system including a display monitor 20, a color printer 30, a CD writer 40, a laser printer 50, a USB hub 60 for connecting additional peripheral devices to the CPU 10, and a scanner 70.

Figure 2A:
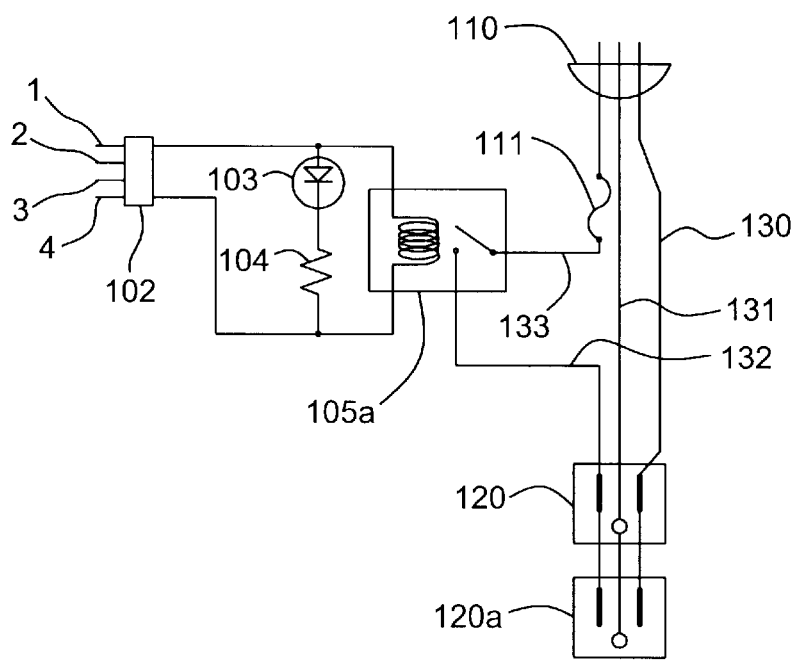
FIGS. 2A, 2B, and 2C are a circuit diagrams of a simplified embodiments of the present invention.
Figure 2B:
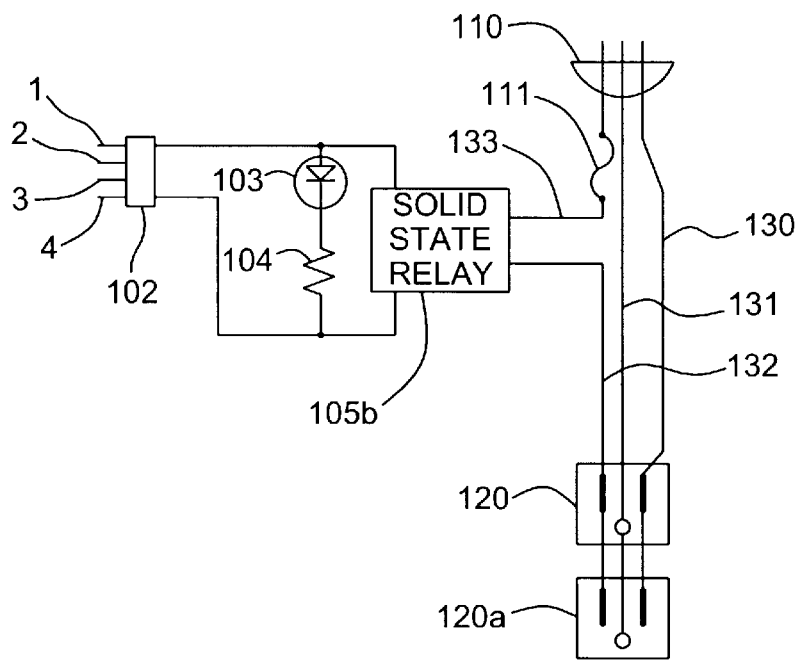
Figure 2C:
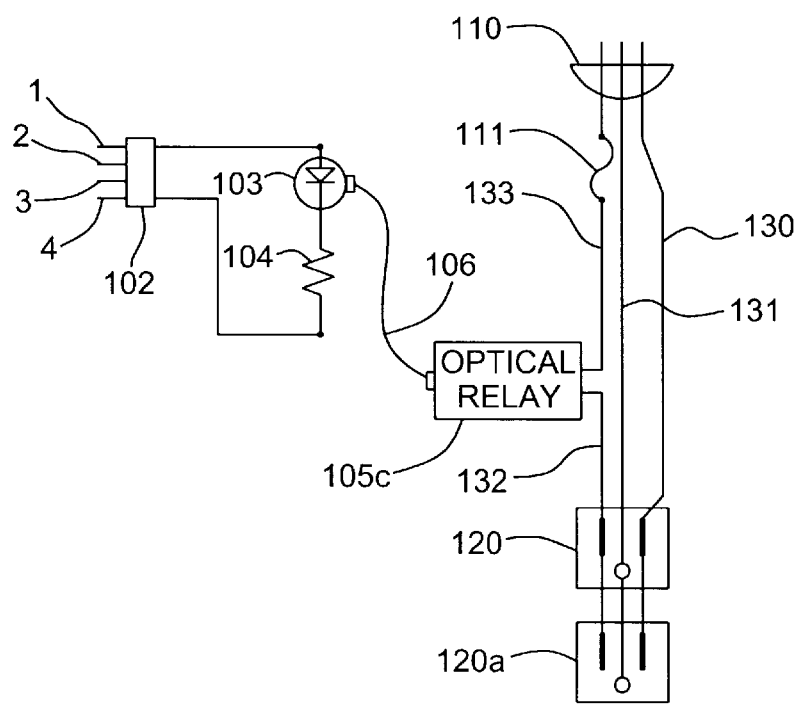

FIGS. 2A–2C are a circuit diagrams of a simplified embodiments of the present invention. Connector 102 is a USB Series "B" connector, which may be, for example, MillMax part number 897-30-004-90-000, mates to the USB cable from the PC (or other desktop computer such as Sun, Macintosh, HP Unix, etc.). The USB standard uses "A" and "B" connectors. "A" connectors head "upstream" toward the computer, while "B" connectors head "downstream" and connect to individual peripheral devices. The USB connector 102 has four pins, 1, 2, 3, and 4. Only pins 1 (VBUS) and 4 (GROUND) of connector 102 are utilized by the power strip of this invention. Pins 2 and 3 (D+ and D−) are data pins and are not used. The power and ground connections in connector 102 are connected to the coil of electromechanical relay 105a (FIG. 2A), which may be, for example, Aromat/NAIS type JS1a-5V, providing 10 Ampere capacity with a 5V 360 mW coil, and to the series combination of a light emitting diode ("LED") 103 and resistor 104. The resistor 104 is selected to provide the LED with the proper current when +5 Volts (nominal) is applied. When +5 Volts is applied to connector 102, relay 105a is energized. The LED provides a visible indication that the relay is energized and that the power strip is activated.

AC power is supplied via power cord and plug 110 connected to a conventional wall outlet. A fuse or circuit breaker 111 protects the device from over-current situations. The current is conducted to the normally open ("NO") contact of relay 105 by "hot" wire 133. The hot wire 132 connects the other contact of the NO pair to outlets 120, 120a. The "ground" wire 131 connects the ground from the wall outlet to outlets 120, 120a via plug 110. The "neutral" wire 130 connects the neutral from the wall outlet to outlets 120, 120a via plug 110.

When the computer is turned on, +5 volts is applied to pin 1 of connector 102, with ground (0 Volts) on pin 4 of 102. This causes relay 105a to be energized, completing the connection between wire 133 and wire 132, and in turn applying AC power to the outlets 120, 120a. Any device plugged into 120 or 120a, with its power switch turned on, would be energized by the application of +5 Volts to connector 102.

When the computer is turned off, +5 Volts is removed from pin 1 of connector 102. This causes relay 105a to be de-energized, interrupting the connection between wire 133 and wire 132, in turn removing power from the outlets 120, 120a. Any device plugged into 120 or 120a, with its power switch turned on, would be de-energized by the removal of +5 Volts to connector 102. In FIG. 2A, the relay is illustrated in a de-energized state.

Relay 105a provides isolation between the AC power system and the computer power system. One skilled in the art could see that a solid state relay 105b using electromagnetic isolation (see FIG. 2B) or a solid state relay 105c using optical isolation (see FIG. 2C) readily could be substituted for electromechanical relay 105a.

Figure 3:
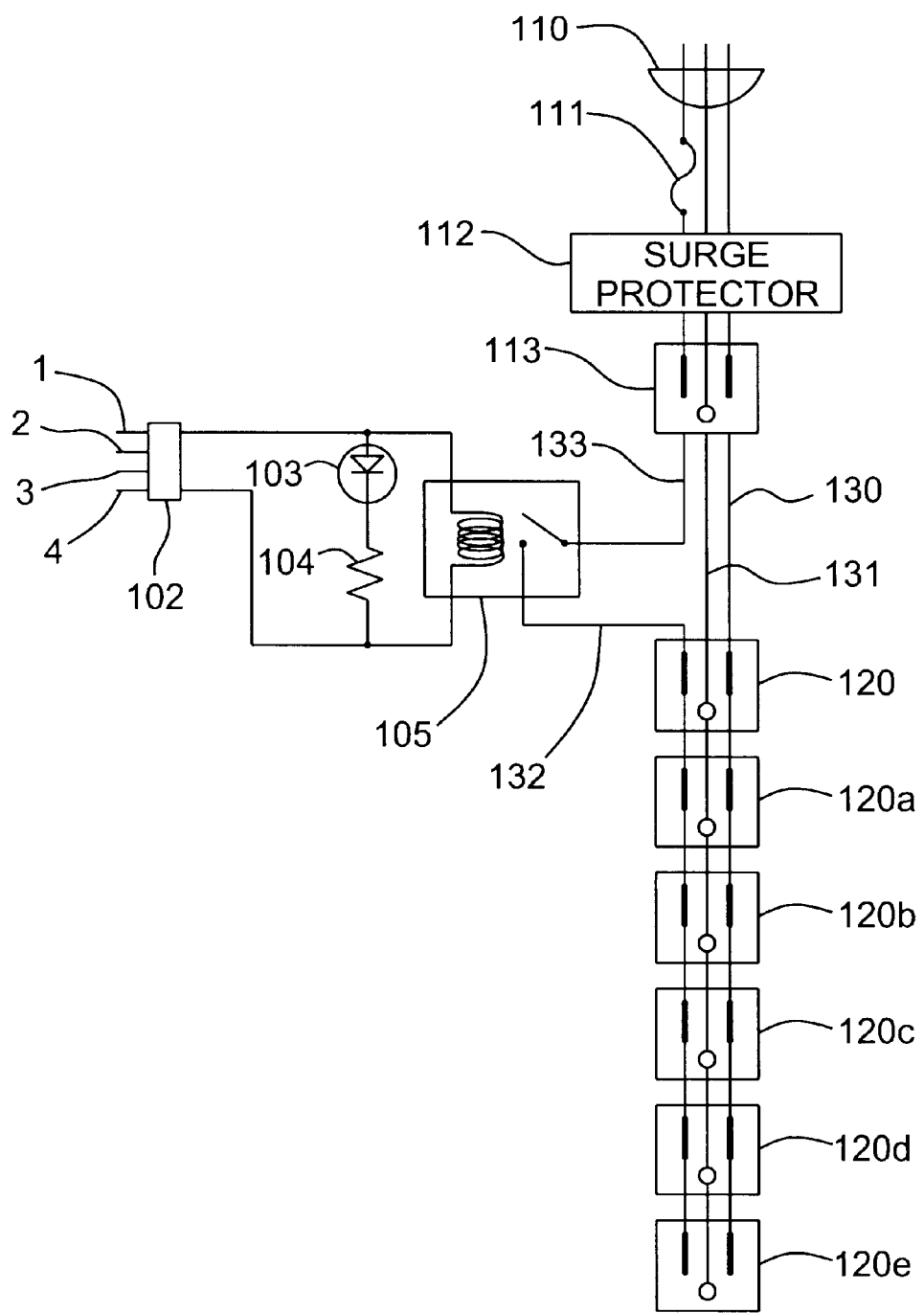

FIG. 3 is a circuit diagram of the preferred embodiment of the present invention having additional features for the user's added convenience. The power strip shown in FIG. 3 includes a surge suppressor 112, commonly found in power strips marketed for computer usage, and an isolated outlet 113, which is not switched by relay 105. The isolated outlet 113 is provided as a convenient place to plug in the computer CPU (not shown in FIG. 3). Power outlets 120b, 120c, 120d, and 120e are included to accommodate additional peripherals. A conventional power strip could be plugged into any of the switched outlets to extend the automatic switching function to additional devices, limited only by the current capacity of the components, especially relay 105 and circuit breaker 111.

One skilled in the art could envision a power strip with a plurality of outlets arranged so that the computer peripherals with corded plugs or wall mount transformer plugs could be conveniently attached. A master switch (not shown) could be added to allow the user to manually select the automatic operation described above—all outlets off, all outlets on, or another advantageous condition.

The preferred embodiment of this invention utilizes a USB connector to connect the power strip device to a power source of the computer. Connection means other than a USB connector can be used to operate the automatic power strip. The industry standard IEEE-1394 (Firewire) connection also contains switched power and ground. Another method would involve a specially designated connection from the computer could be built onto a motherboard or an internal peripheral card to provide such switched power. The connection means could also comprise a USB cable wired to the relay 105 and extending from the housing 100, such that the USB cable could be plugged directly into a USB port of a computer CPU.

An optical connection also could be used, as light sensitive semiconductors (bipolar transistors, FETs, SCRs or Triacs) can be used as receivers for this signal, which could be carried by a fiber optic cable. In this case, an LED 103 (see FIG. 2C) or other optical emitter would be illuminated when the PC is on. The LED would be mounted in such a way that it could be attached to a fiber optic cable 106 (see FIG. 2C) which connects it to the automatic power strip where a light sensitive device receives the signal. The fiber optic connection 106 would provide the necessary isolation between the AC power and the computer power supply.

Having described several embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

I claim:

1. A power strip device, comprising:
   a. a housing having at least one power outlet for receiving a plug from an AC powered component;
   b. an electrical cord extending from the housing, for connecting said power strip device into an electrical socket, said electrical cord having wire for delivering electrical current to the power strip device;
   c. a relay element wired to said at least one power outlet, said relay element being alternately in an i) energized state and thereby allowing electrical current to pass from said electrical cord to said at least one power outlet, or in a ii) de-energized state and thereby preventing electrical current from passing from said electrical cord to said at least one power outlet; and
   d. a USB connector, integral to said housing and wired to the relay element, for receiving a USB plug and connecting said electrical power strip device to a computer CPU, such that i) when the CPU is turned on, power will pass through the USB connector to cause said relay element to be in an energized state and ii) when the CPU is turned off, power will not pass through the USB connector, thereby causing said relay element to be in a de-energized state.

2. The power strip device of claim 1, wherein the relay element is an electromechanical relay device.

3. The power strip device of claim 1, wherein the relay element is a solid-state relay device.

4. The power strip device of claim 1, wherein the relay element is an optical relay device.

5. The power strip device of claim 1, further comprising a circuit breaker positioned within said housing and wired to said at least one power outlet to prevent electrical current overload.

6. The power strip device of claim 1, further comprising a surge suppressor element positioned within said housing and wired to said at least one power outlet to suppress any power surges before reaching said at least one power outlet.

7. The power strip device of claim 1, further comprising a master switch integral to said housing and wired to said at least one power outlet, such that said master switch can be manually toggled to prevent electrical current from being delivered to said at least one power outlet or to enable electrical current regardless of the state of said relay.

8. A power strip device, comprising:
   a. a housing having at least one power outlet for receiving a plug from an AC powered component;
   b. an electrical cord extending from the housing, for connecting said power strip device into an electrical socket, said electrical cord having wire for delivering electrical current to the power strip device;
   c. a relay element wired to said at least one power outlet, said relay element being alternately in an i) energized state and thereby allowing electrical current to pass from said electrical cord to said at least one power outlet, or in a ii) de-energized state and thereby preventing electrical current from passing from said electrical cord to said at least one power outlet; and d. connection means, integral to said housing and wired to the relay element, for connecting said electrical power strip device to a power source of a computer CPU, such that i) when the CPU is turned on, power will pass through the connection means to cause said relay element to be in an energized state and ii) when the CPU is turned off, power will not pass through the connection means, thereby causing said relay element to be in a de-energized state.

9. The power strip device of claim 8, wherein the connection means is a USB connector for receiving a USB cable that is connected to the computer CPU.

10. The power strip device of claim 8, wherein the connection means is a Firewire connector for receiving a Firewire cable that is connected to the computer CPU.

11. The power strip device of claim 8, wherein the connection means is an optical connector for receiving an optical signal emitted by the computer CPU when it is turned on.

12. The power strip device of claim 8, wherein the connection means is a USB cable extending from the housing and wired to the relay element, wherein the USB cable can be plugged into a USB port on the CPU.

13. The power strip device of claim 8, wherein the relay element is an electromechanical relay device.

14. The power strip device of claim 8, wherein the relay element is a solid-state relay device.

15. The power strip device of claim 8, wherein the relay element is an optical relay device.

16. The power strip device of claim 8, further comprising a circuit breaker positioned within said housing and wired to said at least one power outlet to prevent current overload.

17. The power strip device of claim 8, further comprising a surge suppressor element positioned within said housing and wired to said at least one power outlet to suppress any power surges before reaching said at least one power outlet.

18. The power strip device of claim 8, further comprising a master switch integral to said housing and wired to said at least one power outlet, such that said master switch can be manually toggled to prevent electrical current from being delivered to said at least one power outlet or to enable electrical current regardless of the state of said relay.

19. A power strip device, comprising:

a. a housing having at least one power outlet for receiving a plug from an AC powered component;

b. an electrical cord extending from the housing, for connecting said power strip device into an electrical socket, said electrical cord having wire for delivering electrical current to the power strip device;

c. a electromechanical relay element wired to said at least one power outlet, said relay element being alternately in an i) energized state and thereby allowing electrical current to pass from said electrical cord to said at least one power outlet, or in a ii) de-energized state and thereby preventing electrical current from passing from said electrical cord to said at least one power outlet;

d. a USB connector, integral to said housing and wired to the relay element, for receiving a USB plug and connecting said electrical power strip device to a computer CPU, such that i) when the CPU is turned on, power will pass through the USB connector to cause said relay element to be in an energized state and ii) when the CPU is turned off, power will not pass through the USB connector, thereby causing said relay element to be in a de-energized state;

e. a circuit breaker positioned within said housing and wired to said at least one power outlet to prevent current overload;

f. a surge suppressor element positioned within said housing and wired to said at least one power outlet to suppress any power surges before reaching said at least one power outlet; and g. a master switch integral to said housing and wired to said at least one power outlet, such that said master switch can be manually toggled to prevent electrical current from being delivered to said at least one power outlet.

* * * * *